US011061390B2

(12) United States Patent
Volponi et al.

(10) Patent No.: US 11,061,390 B2
(45) Date of Patent: Jul. 13, 2021

(54) SYSTEM FAULT ISOLATION AND AMBIGUITY RESOLUTION

(71) Applicant: United Technologies Corporation, Farmington, CT (US)

(72) Inventors: Allan J. Volponi, West Simsbury, CT (US); Liang Tang, Glastonbury, CT (US); Sang Jun Lee, Los Altos, CA (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 482 days.

(21) Appl. No.: 16/016,801

(22) Filed: Jun. 25, 2018

(65) Prior Publication Data

US 2019/0130294 A1    May 2, 2019

Related U.S. Application Data

(60) Provisional application No. 62/577,265, filed on Oct. 26, 2017.

(51) Int. Cl.
*G06N 5/04* (2006.01)
*G01D 5/00* (2006.01)
*G05B 23/02* (2006.01)

(52) U.S. Cl.
CPC .......... *G05B 23/0254* (2013.01); *G01D 5/00* (2013.01); *G06N 5/048* (2013.01)

(58) Field of Classification Search
CPC ....... G01D 5/00; G05B 23/0254; G06N 5/048

USPC ............... 702/35, 185; 342/422; 701/472
See application file for complete search history.

(56) References Cited

U.S. PATENT DOCUMENTS

| 6,278,945 B1 * | 8/2001 | Lin ............ G01C 21/165 |
| | | 701/472 |
| 6,311,129 B1 * | 10/2001 | Lin ............ G09B 9/08 |
| | | 342/422 |
| 2009/0248363 A1 | 10/2009 | Butler | |

OTHER PUBLICATIONS

L Tang, et al., Intelligent Reasoning for Gas Turbine Fault Isolation and Ambiguity Resolution, Proceeding of ASME Turbo Expo 2018, Turbomachinery Technical Conference and Exposition GT2018, Jun. 11-15, 2018, Oslo, Norway, 12 pages.

(Continued)

*Primary Examiner* — John H Le
(74) *Attorney, Agent, or Firm* — Cantor Colburn LLP

(57) ABSTRACT

A fault isolation and ambiguity resolution system includes one or more analytic engines executable by a processing system and a reasoning system. The one or more analytic engines are operable to detect a fault associated with a monitored system based on data extracted from one or more data repository. The reasoning system includes a single fault isolator operable to identify an ambiguity group including the fault and one or more related faults of the monitored system. The reasoning system also includes an inference system operable to utilize evidence to resolve ambiguity between the fault and the one or more related faults of the ambiguity group as a diagnosis result.

16 Claims, 10 Drawing Sheets

(56) References Cited

OTHER PUBLICATIONS

EP Application No. 18202388.7 Office Action dated Dec. 13, 2019, 3 pages.
EP Application No. 18202388.7 Extended EP Search Report dated Mar. 1, 2019, 10 pages.
Oliveira, et al., Fault Detection and Diagnosis in dynamic systems using Weightless Neural Networks, Expert Systems With Applications, vol. 84, May 8, 2017, pp. 200-219.

* cited by examiner

FIG. 3 and FIG. 4

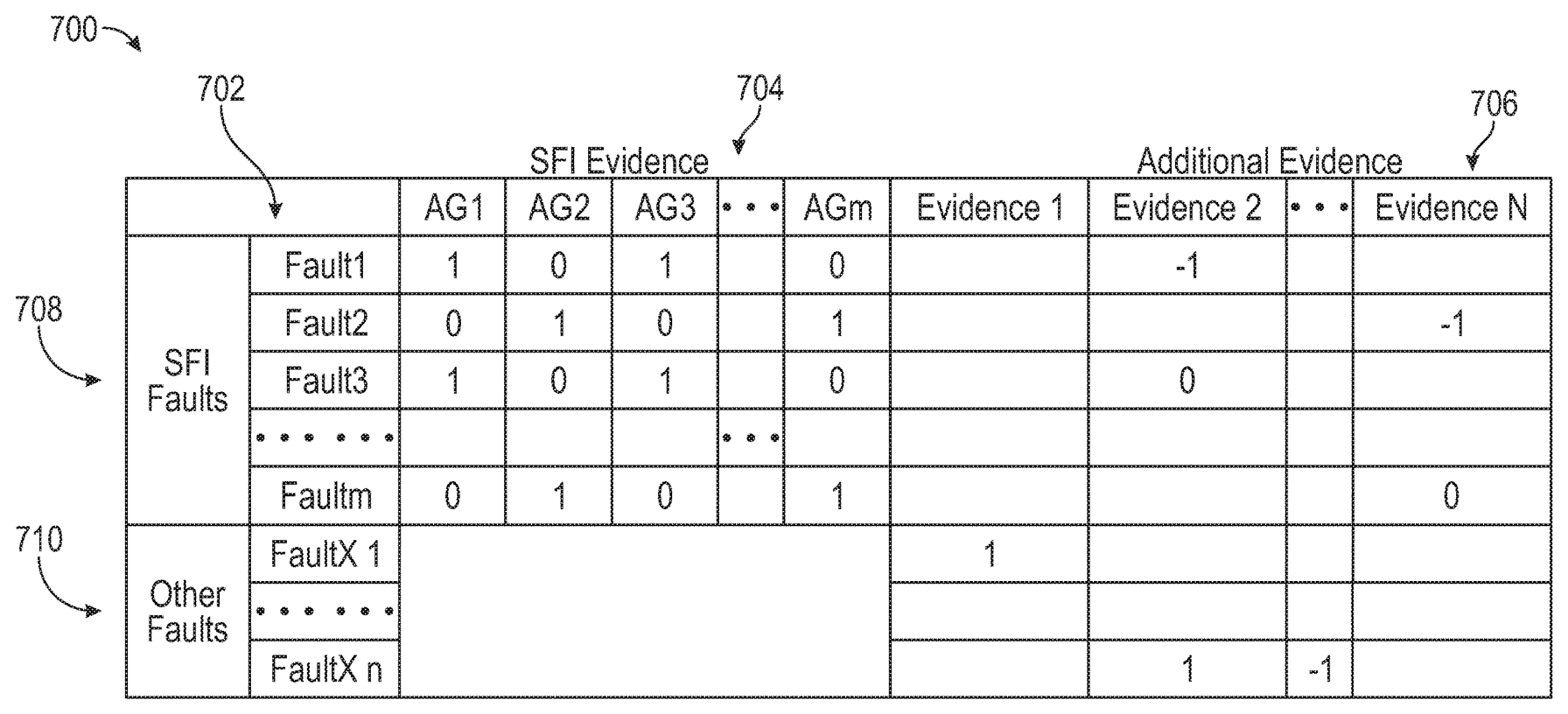

| | SFI Evidence | | | | | Additional Evidence | | | |
|---|---|---|---|---|---|---|---|---|---|
| | AG1 | AG2 | AG3 | ... | AGm | Evidence 1 | Evidence 2 | ... | Evidence N |
| SFI Faults | Fault1 | 1 | 0 | 1 | | 0 | | -1 | | |
| | Fault2 | 0 | 1 | 0 | | 1 | | 0 | | -1 |
| | Fault3 | 1 | 0 | 1 | | 0 | | | | |
| | ... | | | | ... | | | | | |
| | Faultm | 0 | 1 | 0 | | 1 | | | | 0 |
| Other Faults | FaultX 1 | | | | | | 1 | | | |
| | ... | | | | | | | | | |
| | FaultX n | | | | | | | 1 | -1 | |

FIG. 7

SYSTEM FAULT ISOLATION AND AMBIGUITY RESOLUTION

CROSS-REFERENCE TO RELATED APPLICATION

This application claims the benefit of priority to U.S. Provisional Application No. 62/577,265 filed Oct. 26, 2017, the disclosure of which is incorporated herein by reference in its entirety.

BACKGROUND

The subject matter disclosed herein generally relates to fault analysis systems and, more particularly, to fault isolation and ambiguity resolution for a monitored system.

Complex engineered systems including such things as vehicles, jet engines, heating, ventilating, and air conditioning (HVAC) systems and elevators typically are systematically monitored to make sure that faults are detected and flagged early. Several types of sensors are used to monitor physical observable conditions such as temperatures, pressures, speeds, levels, rates, and vibrations. System health monitoring is commonly distributed among these sensors to detect faults when failure conditions occur. Monitoring of sensed parameters can be useful to declare general fault conditions, but it can be challenging to isolate the likely causes of the fault conditions and to predict when faults are likely to occur.

BRIEF DESCRIPTION

According to one embodiment, a fault isolation and ambiguity resolution system includes one or more analytic engines executable by a processing system and a reasoning system. The one or more analytic engines are operable to detect a fault associated with a monitored system based on data extracted from one or more data repository. The reasoning system includes a single fault isolator operable to identify an ambiguity group including the fault and one or more related faults of the monitored system. The reasoning system also includes an inference system operable to utilize evidence to resolve ambiguity between the fault and the one or more related faults of the ambiguity group as a diagnosis result.

In addition to one or more of the features described above or below, or as an alternative, further embodiments may include where the single fault isolator is operable to determine a measure of closeness to isolate the fault and the one or more related faults to the ambiguity group from a plurality of possible faults.

In addition to one or more of the features described above or below, or as an alternative, further embodiments may include where the reasoning system is operable to form a confusion matrix comprising a plurality of results from the single fault isolator indicative of a degree of fault ambiguity between an implanted fault and an observed fault.

In addition to one or more of the features described above or below, or as an alternative, further embodiments may include where the reasoning system is operable to discard one or more values from the confusion matrix below a predetermined risk level to form a risk-adjusted confusion matrix.

In addition to one or more of the features described above or below, or as an alternative, further embodiments may include where the reasoning system is operable to form a diagnosis matrix including an ambiguity group matrix based on the risk-adjusted confusion matrix, additional evidence indicating relationships between the implanted faults, and one or more relationships between a plurality of symptoms and one or more other faults.

In addition to one or more of the features described above or below, or as an alternative, further embodiments may include where the diagnosis matrix is sparsely populated with one or more of the relationships being undefined.

In addition to one or more of the features described above or below, or as an alternative, further embodiments may include where the reasoning system is operable to perform an ambiguity group ranking and determine an associated confidence.

In addition to one or more of the features described above or below, or as an alternative, further embodiments may include where the associated confidence is determined based on a fuzzy belief mapping that assigns relative differences with respect to past values to compare an anticipated consequence with an observed consequence.

In addition to one or more of the features described above or below, or as an alternative, further embodiments may include where the reasoning system is operable to: select the ambiguity group having a first rank, identify a plurality of fault modes in the ambiguity group having the first rank, locate supporting evidence based on the diagnosis matrix, invoke the one or more analytic engines to produce evidence based on accessing the one or more data repository, determine an evidence belief confidence, and aggregate the evidence belief confidence.

In addition to one or more of the features described above or below, or as an alternative, further embodiments may include a user display operable to output a graphical user interface including the diagnosis result and operable to provide access to event reasoning details and reasoner analysis interpretation associated with the diagnosis result responsive to a selection.

According to another embodiment, a method of fault isolation and ambiguity resolution is provided. The method includes detecting, by one or more analytic engines, a fault associated with a monitored system based on data extracted from one or more data repository. The method also includes identifying, by a single fault isolator, an ambiguity group including the fault and one or more related faults of the monitored system, and utilizing evidence, by an inference system, to resolve ambiguity between the fault and the one or more related faults of the ambiguity group as a diagnosis result.

A technical effect of the apparatus, systems and methods is achieved by performing fault isolation and ambiguity resolution for a monitored system as described herein.

BRIEF DESCRIPTION OF THE DRAWINGS

The following descriptions should not be considered limiting in any way. With reference to the accompanying drawings, like elements are numbered alike:

FIG. 3 is an example of a confusion matrix, in accordance with an embodiment of the disclosure;

FIG. 4 is an example of a risk-adjusted confusion matrix, in accordance with an embodiment of the disclosure;

FIG. 7 is an example of a diagnosis matrix, in accordance with an embodiment of the disclosure;

DETAILED DESCRIPTION

Figure 1:
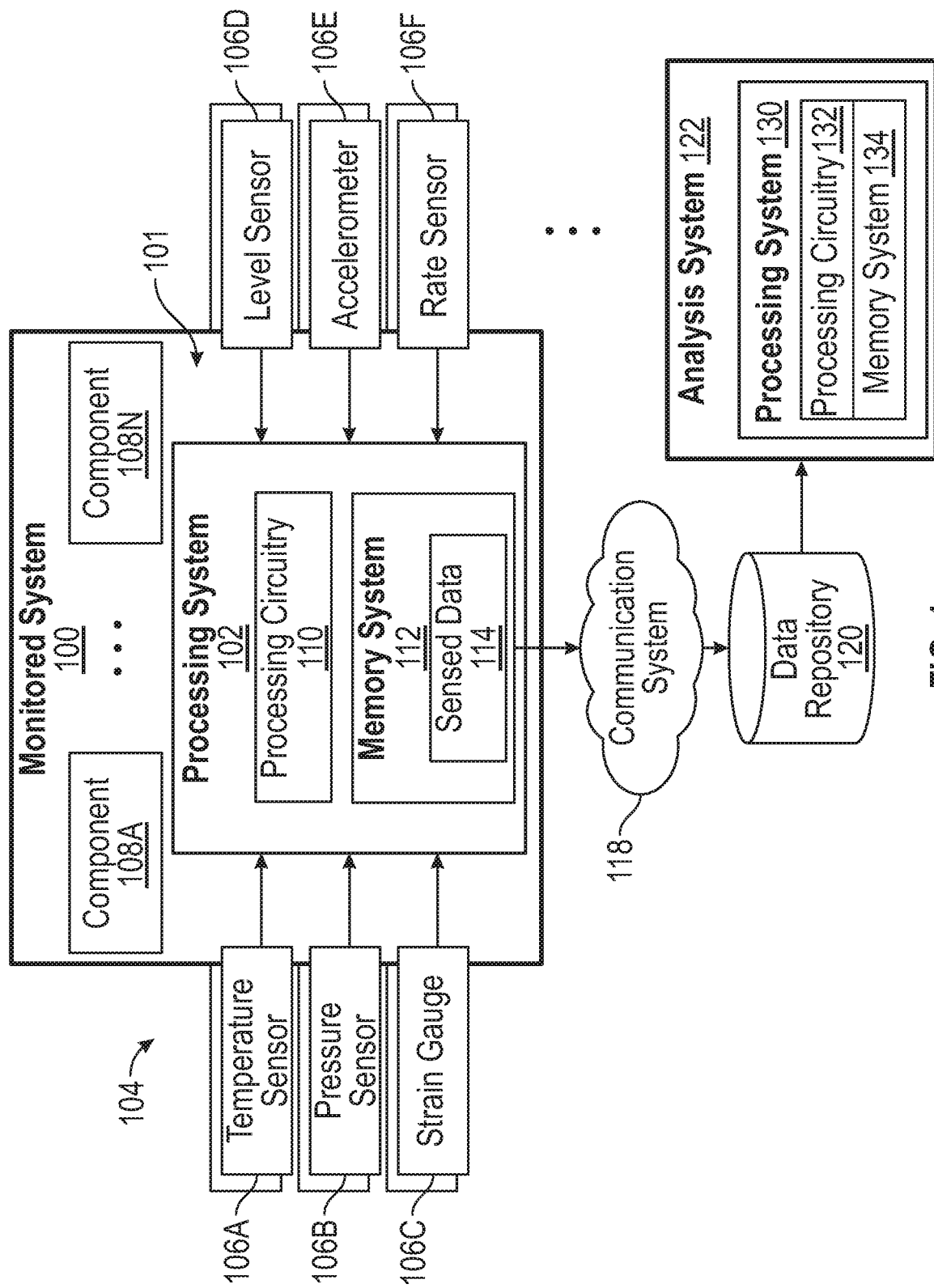
FIG. 1 is a block diagram of a monitored system, in accordance with an embodiment of the disclosure.

A detailed description of one or more embodiments of the disclosed apparatus and method are presented herein by way of exemplification and not limitation with reference to the Figures.

Fault detection and isolation systems typically operate under an assumption that a detected fault condition is attributable to a single fault event. However, there can be multiple fault conditions that may not be readily distinguishable from each other. Thus, ambiguity can arise in the process of identifying system faults that manifest themselves in identical or near-identical indications. Ambiguity in diagnosis can become more pronounced as the number of sensor measurements decreases. For example, with respect to a gas turbine engine, most engine major module faults cause engine exhaust gas temperature (EGT) to increase. If an EGT sensor is the only probe available for diagnosis, then these faults would be in the same ambiguity group. Therefore, ambiguity can be a consequence of a diagnostic identification procedure. An ambiguity group can be defined as a group of replaceable items which may have faults resulting in the same fault signature, and the group of items to which a given fault is isolated, any one of which may be the actual faulty item.

In order to resolve fault ambiguity, cross-referencing of performance at different operational conditions can be performed as well as utilizing other parameters. For instance, continuing with the example of a gas turbine engine as a monitored system, gas path parameters can be observed in combination with non-gas path parameters, such as vibration, oil pressure/temperature and the like, to determine a likely fault source based on domain knowledge and past experience. Embodiments provide an automated intelligent diagnostic reasoning capability to assist a monitoring analyst in the detection and identification of faults to enable more effective and efficient maintenance of a monitored system. A fault isolation and ambiguity resolution system can execute a diagnostic process that employs a single fault hypothesis algorithm to identify an appropriate ambiguity group containing the actual underlying fault, an analysis process to identify additional data along with attendant analytics to produce additional health information, an information fusion process to reduce or resolve the ambiguities using the available information, and a confidence analyzer to produce a confidence level associated with the analysis.

Embodiments can improve fault detection indicator performance by providing greater diagnostic accuracy and rapid reduction of ambiguity. A diagnostic output can be formulated as an Ambiguity Group (AG) instead of a single fault. Unlike many approaches that are either physics based (model based) or empirical (data driven), embodiments can combine both and apply fuzzy inferences in combination with evidence theory to resolve ambiguity. Diagnostic confidence can be translated to a linguistic interpretation. By using a modular and expandable architecture, the fault isolation and ambiguity resolution system can be adapted to a variety of monitored systems as further described herein.

Referring now to the drawings, FIG. 1 illustrates a monitored system 100 that is observed by a monitoring system 101 that includes a processing system 102 coupled to a sensor system 104. The sensor system 104 includes a plurality of sensors 106 that are configured to collect diagnostic and operational data related to the monitored system 100. The monitored system 100 can be any type of machine or system comprised of a plurality of components 108A-108N subject to detectable and predictable failure modes. For example, the monitored system 100 can be a vehicle, an engine, an HVAC system, an elevator system, industrial machinery, or the like. For purposes of explanation, embodiments are primarily described with respect to an engine system of an aircraft as the monitored system 100. In the example of FIG. 1, the sensors 106 monitor a plurality of parameters of the monitored system 100, such as one or more temperature sensors 106A, pressure sensors 106B, strain gauges 106C, level sensors 106D, accelerometers 106E, rate sensors 106F, and the like.

The processing system 102 can include processing circuitry 110 and a memory system 112 to store data and instructions that are executed by the processing circuitry 110. The executable instructions may be stored or organized in any manner and at any level of abstraction, such as in connection with a controlling and/or monitoring operation of the sensor system 104. The processing circuitry 110 can be any type or combination of central processing unit (CPU), including one or more of: a microprocessor, a digital signal processor (DSP), a microcontroller, an application specific integrated circuit (ASIC), a field programmable gate array (FPGA), or the like. Also, in embodiments, the memory system 112 may include random access memory (RAM), read only memory (ROM), or other electronic, optical, magnetic, or any other computer readable medium onto which is stored data and algorithms in a non-transitory form. The processing system 102 is operable to access sensor data from the sensor system 104 and store values as sensed data 114 in the memory system 112. The processing system 102 can also interface with a communication system 118 to send and receive data values, such as sensed data 114, to a data repository 120. The processing system 102 can include other interfaces (not depicted), such as various outputs, wireless communication interfaces, and the like. The sensed data 114 can be snapshots or more densely populated data stream readings from the sensor system 104. The sensed data 114 can also or alternatively include fault events with fault codes indicative of a soft or hard failure. A soft failure refers to a failure condition that allows continued operation in a partially degraded condition, while a hard failure can prevent continued operation of one or more component 108A-108N.

The data repository 120 can be subdivided or distributed between multiple databases and/or locations. In embodiments, the data repository 120 is accessible by an analysis system 122 (also referred to as fault isolation and ambiguity resolution system 122). The analysis system 122 can be in close physical proximity to the monitored system 100 or may be remotely located at a greater distance. The analysis system 122 may also interface with a number of other instances of the data repository 120 associated with other instances of the monitored system 100 (e.g., a fleet of monitored systems 100). Similar to the monitoring system 101, the analysis system 122 includes a processing system 130 with processing circuitry 132 and a memory system 134 operable to hold data and instructions executable by the processing circuitry 132. In some embodiments, the processing system 130 is a workstation, a mainframe, a personal computer, a tablet computer, a mobile device, or other computing system configured as disclosed herein, while the processing system 102 may be an embedded computing system of the monitored system 100 operable to perform real-time data acquisition and analysis. Further, the processing system 130 can be distributed between multiple computing devices.

Figure 2:
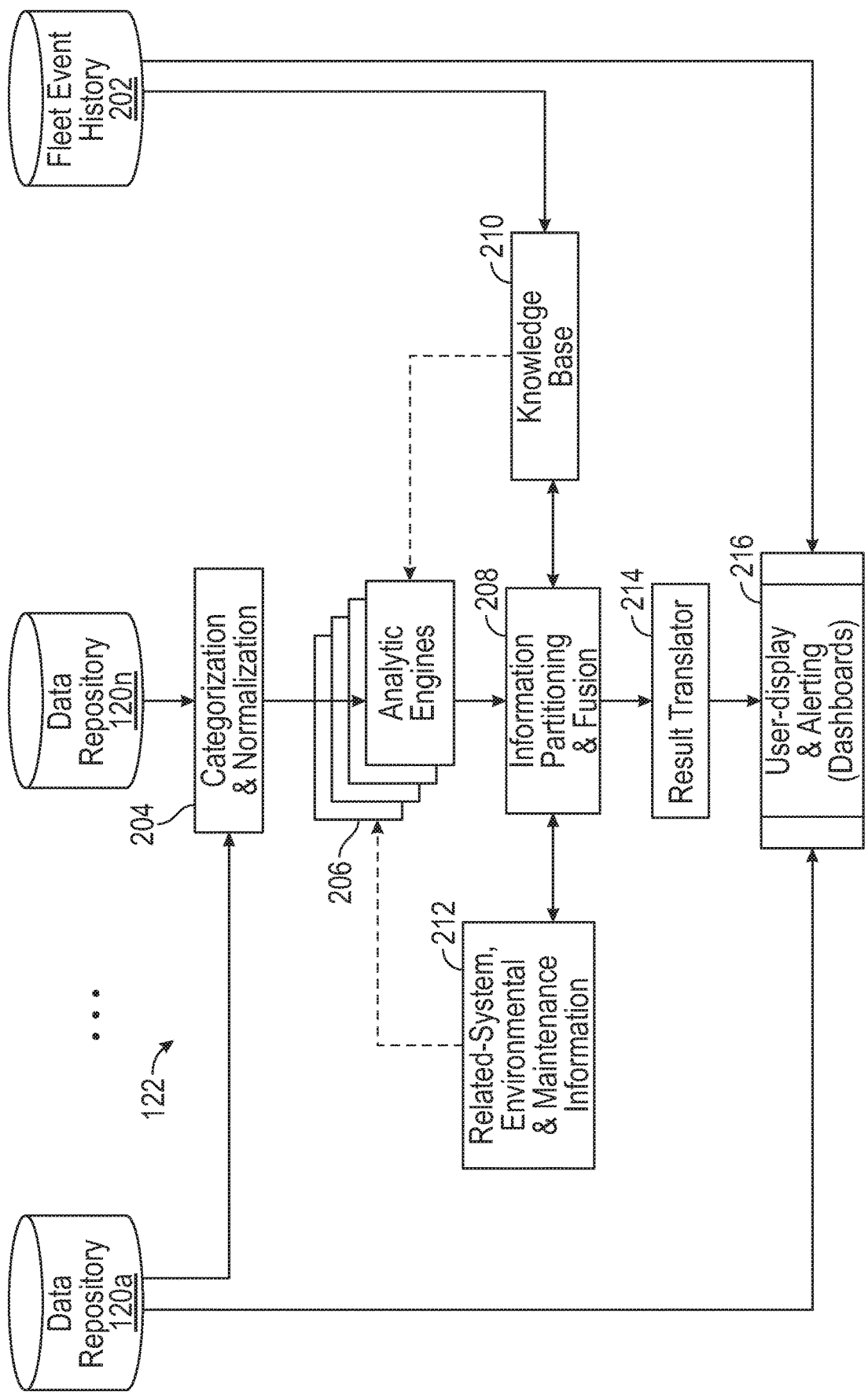
FIG. 2 is a block diagram of a fault isolation and ambiguity resolution system, in accordance with an embodiment of the disclosure.

FIG. 2 depicts elements of the analysis system 122 in greater detail. Various data sources, such as data repository 120A-120N and/or other data sources (not depicted) can be accessed by a categorization and normalization processor 204 of the analysis system 122. With respect to an aircraft example, data sources can be, for example, Aircraft Condition Monitoring Function (ACMF) snapshots or full flight streaming data, and each data repository 120A-120N may be associated with a different engine and/or different aircraft. The categorization and normalization processor 204 is operable to recognize the type of data that is presented, identify applicable normalization and correction factors to apply (e.g., to reduce variation), and can determine which analytical components are appropriate to process the data to yield pertinent health indicators. Analytic engines 206 of the analysis system 122 form a collection of routines, e.g., models, detection methods, isolation methods, etc., that are applied to the data stream resulting from the categorization and normalization processor 204. Continuing with the example of gas path performance data, the analytic engines 206 can detect a no fault situation or a fault can be detected and isolated to a particular ambiguity group along with a level of confidence as further described herein.

Information partitioning and fusion 208 of the analysis system 122 can implement an intelligent reasoning process to resolve ambiguity. The reasoning performed as part of the information partitioning and fusion 208 can use a knowledge base 210 of domain knowledge, which can include rules regarding operation & control of components 108A-108N of FIG. 1, failure modes, cross-system assessment, negative information, etc., and may access additional data and analytics that can be automatically retrieved and processed, such as from fleet event history 202. The fleet event history 202 may summarize known events and associated conditions that have previously occurred on one or more aircraft, for example. Likewise, related-system, environmental, and maintenance information 212 can form an additional set of knowledge and heuristics that can be applied as part of the information partitioning and fusion 208. The information partitioning and fusion 208 provides a reduction in ambiguity to assist in or fully resolve an underlying fault.

The analysis system 122 can also include a result translator 214 to convert fault and health information into terms that are meaningful to the intended end user. The result translator 214 can output results in different formats depending upon the role of the end user. For example, an airline manager monitoring a fleet may desire to view different information than the information desired by a maintenance, repair, and overhaul (MRO) provider planning an overhaul or line maintenance activity. As a simple example with respect to gas path diagnosis, if a High Pressure Compressor (HPC) fault is diagnosed, a typical output in terms of supplying an estimate of the magnitude of the change in performance can be provided in terms of adiabatic efficiency and compressor flow capacity. To the typical airline powerplant engineer, such information may not be readily useful. However, by translating the deviation in terms of how it impacts a change in Takeoff EGT Margin, or Cruise Specific Fuel Consumption or Compressor Surge Margin, the results can be more readily useful.

The analysis system 122 can also include user display and alerting 216 that conveys information to an end user. User display and alerting 216 can provide a number of dashboards and/or an interactive graphical user interface (GUI). Various examples are further provided herein.

Continuing with the engine system example, the analytic engines 206 can use a Single Fault Isolator (SFI) for identifying underlying faults having a performance impact based on effects of measurable parameters in the gas path of an engine. SFI can apply a pattern matching algorithm operating under a single fault hypothesis. A predetermined list of potential fault scenarios can be evaluated one at a time and then rank ordered by how close each of these individual solutions is relative to what has been observed in gas path measurements. The measure of closeness is a measurement error norm, which is a normalized weighted error term between the observed (measurement) ΔΔ parameter shifts and the expected ΔΔ parameter shifts assuming a specific single fault scenario.

The measurement error norm is a metric used to determine how close a selected fault hypothesis (isolation selection) matches up to the observations at hand. SFI is a fault isolation process that looks at all possible faults from a (pre-defined) fault list and selects the fault that best matches the observed shifts in the gas path parameters. The best match criteria can be accomplished by first generating what the gas path shifts would be if the selected fault under consideration was the fault being sought and then computing a distance metric between this set of parameter shifts and the observed parameter shifts. Doing this across the set of all possible faults and selecting the one admitting the smallest distance is the best match (or first ranked fault). The fault admitting the second smallest distance is the second ranked fault, the fault with the third smallest distance is the third ranked fault, and so on.

The predefined list of potential single fault scenarios to test sequentially as candidate faults can admit a good deal of ambiguity, i.e., many faults fall in one or more AGs. When AGs exist, a best expected outcome of the analysis can be the ability to isolate to the AG containing the actual underlying fault and to do so with a high confidence. Isolating to the appropriate AG can be accomplished with higher confidence than attempting to isolate to a single specific fault within that group (using SFI). It can be determined, a-priori, what ambiguities are expected. This can be performed by starting with a predefined list of faults that a gas path diagnostic system may encounter. A sample list of gas path faults is given in Table 1 for the example of a gas turbine engine.

TABLE 1

| Predefined fault list of gas path faults |
|---|
| Component |
| Fan Performance |
| Low Pressure Compressor (LPC) Performance |
| High Pressure Compressor (HPC) Performance |
| High Pressure Turbine (HPT) Performance |
| Low Pressure Turbine (LPT) Performance |
| Fan Duct Leakage |
| Fan Duct Pressure Loss |
| Combustor Pressure Loss |

TABLE 1-continued

Predefined fault list of gas path faults

Sub-System 2.5 Stability Bleed
7th Stage Stability Bleed
10th Stage Stability Bleed
7th Service Stability Bleed
10th Service Stability Bleed
ECS Bleed Switch (7th to 10th)
Turbine Cooling Air (TCA) Valve Fault
Low Turbine Case Cooling Failed Closed
High Turbine Case Cooling Failed Closed
HPC Variable Stator Vane (VSV)
Sensor Mach number; Altitude; Total Air Temperature (TAT) or Compressor Inlet Temperature (T2); Compressor Inlet Pressure (P2), Low Spool Speed (N1), High Spool Speed (N2), Fuel Flow (Wf), Inter-compressor Temperature (T25), Inter-compressor Pressure (P25), HPC Exit Temperature (T3), Burner Pressure (Pb), EGT, Turbine Exit Pressure (P5)

Figures 3, 4:
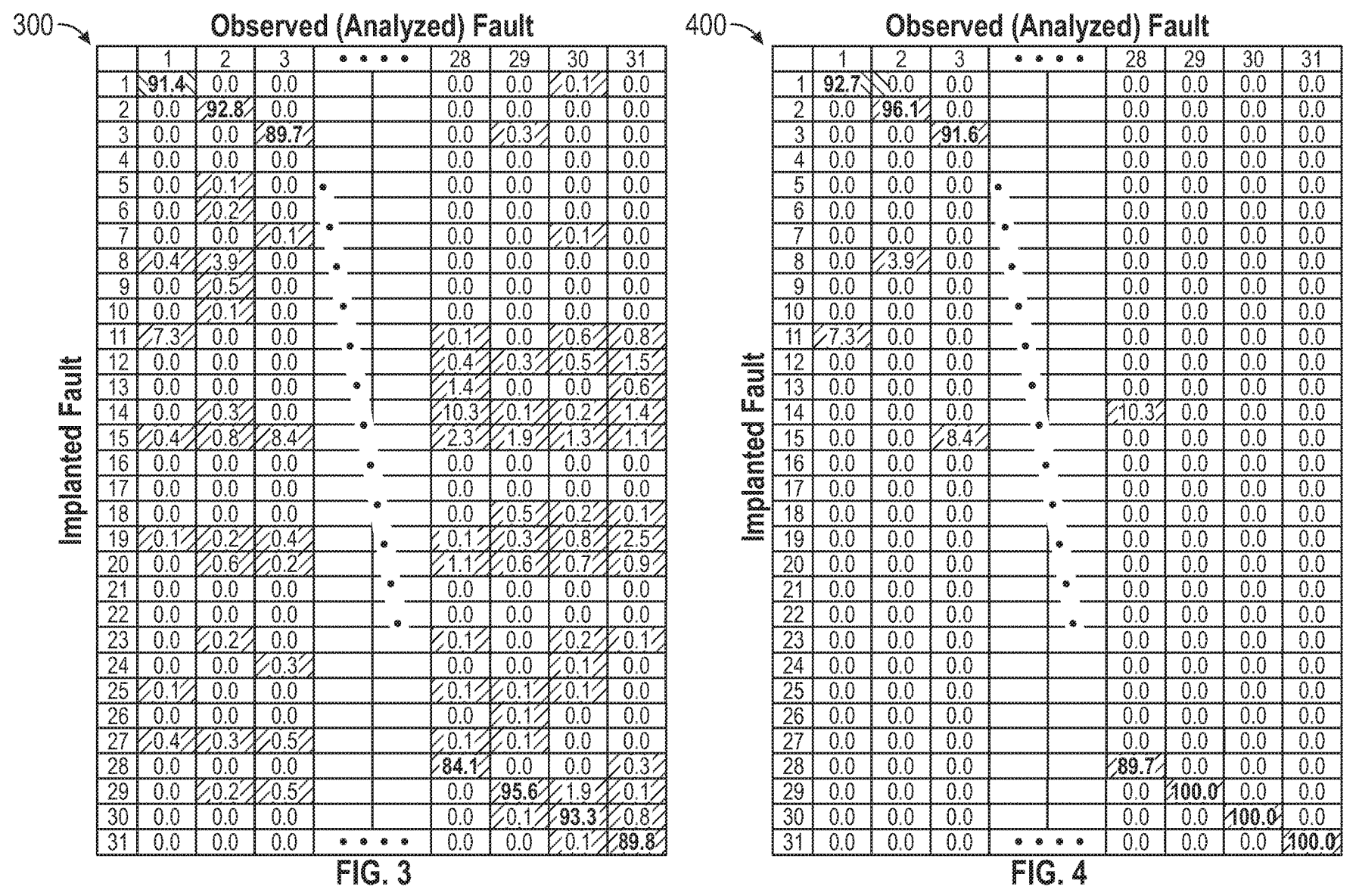

To determine the AG structure, a Monte Carlo simulation can be run, where a sample of N noisy measurement vectors can be generated for each of the faults in the predefined fault list. Each vector can include m sensor measurement $\Delta$s and represents (ideally) the percent shift observed due to the injected fault. Noise can be generated with Gaussian statistics using a known measurement covariance. Each of the N vectors can also be the result of a random distribution of fault magnitudes for any given fault in the predefined fault list. As a simple example, all calculations can be carried out as percent changes. The resultant measurement $\Delta$ vectors can be subjected to the SFI, and the results can be captured in a confusion matrix. FIG. 3 depicts an example of a confusion matrix 300.

Rows of the confusion matrix 300 represent implanted faults, and columns of the confusion matrix 300 represent the SFI analyzed results (observed faults). Consequently, the diagonal of the confusion matrix 300 represents the percentage of successful fault isolations. If there was no ambiguity present, the confusion matrix 300 would be diagonal with 100% down the entire diagonal. Off-diagonal (positive) entries in a given column of the confusion matrix 300 indicate which faults are ambiguous with the implanted fault and the percent magnitude is a measure of the degree of fault ambiguity. It should be clear that the results depend on a number of factors, i.e., the measurement suite, the SFI algorithm, measurement noise, fault magnitude range, and the sample size N. For a given application, the first three items are fixed, leaving just the sample size N to consider. Since the noise is assumed Gaussian, it should be clear that as $N \rightarrow \infty$, there will be total ambiguity, i.e., there will be no exactly zero percent entries. Most entries will be extremely small values and from an engineering perspective may constitute a "don't care" situation. This can be quantified as a willingness to tolerate an $\alpha$ % risk (i.e., a predetermined risk level), in that if a fault has a (confusion) level$\leq \alpha$ %, the fault can be discarded from the AG. If, for example, the discard strategy is applied to the confusion matrix 300 of FIG. 3 for a value of $\alpha = 3\%$, after the totals are readjusted, a 3% risk-adjusted confusion matrix 400 results as depicted in FIG. 4.

The risk-adjusted confusion matrix 400 provides an anticipated AG for the first ranked single fault resulting from the SFI analysis process described above. In effect, the first ranked AG is dictated by the risk-adjusted confusion matrix 400. The confidence for the first ranked AG diagnosis can be defined and calculated in various ways. For example, the measurement error norm of the top ranked SFI fault mode can have a mathematical interpretation that relates to the level of confidence that the observed symptoms match a known fault pattern. However, field analysts may desire a more intuitive interpretation for the confidence level. Note that the confidence represents the level of trust in the diagnosis, rather than the probability that the diagnosed fault has occurred. Embodiments can calculate the confidence for the first ranked AG based on the measurement error norms of the faults in the AG and the separability of the first ranked AG to other AGs. For example, a fuzzy expert rule can be formulated as "IF Measurement Error Norm is small AND separability from the second ranked AG is high, THEN diagnosis confidence is high". It will be understood that other conditions can be used for fuzzy expert rules. As a result, a confidence value can be output between 0 and 1 where 1 indicates 100% confidence.

Figure 5:
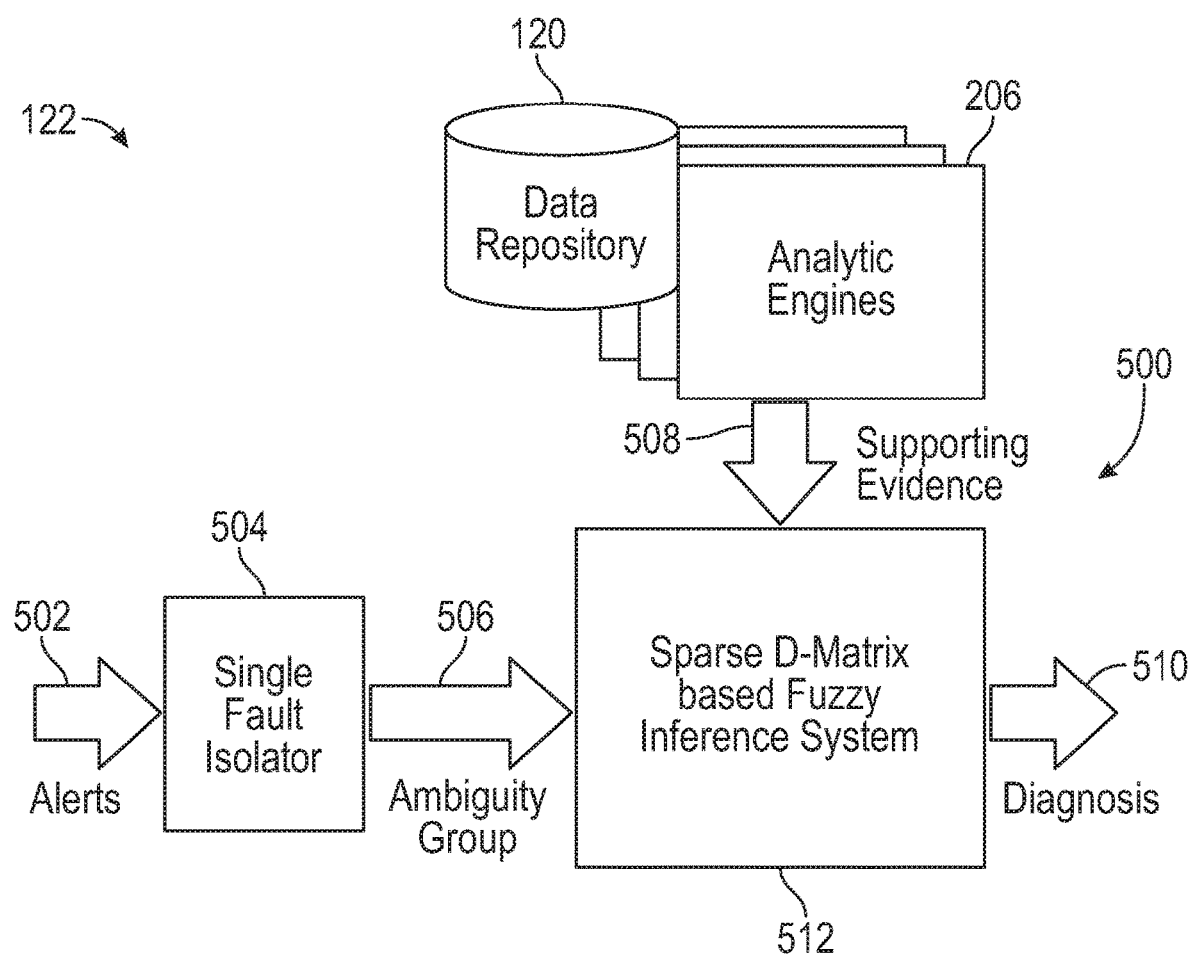
FIG. 5 is a block diagram of a reasoning system, in accordance with an embodiment of the disclosure.

A reasoning system 500 is depicted in FIG. 5 as a portion of the analysis system 122. For example, the reasoning system 500 (also referred to as a reasoner) can be incorporated in the information partitioning and fusion 208 of FIG. 2 and is automated, i.e. a human expert is not needed for the initial diagnostic assessment. Diagnostic reasoning by the reasoning system 500 can be triggered automatically by alerts 502 (which can also be detected by automated algorithms). The first step for fault diagnosis can include execution of SFI 504, which produces a first ranked AG 506, for example using risk-adjusted confusion matrix 400 of FIG. 4. The next step is to collect and combine additional evidence 508 for ambiguity resolution, which is also automated. The reasoning system 500 can be configurable using, for example, one or more configuration tables (not depicted). The collection of additional evidence 508 through the analytic engines 206 can be configured as a generic table structure, such that no ad hoc programming is required to apply the reasoning system 500 to a different type of monitored system 100 of FIG. 1. The interface between the analytic engines 206 and the reasoning system 500 can be standardized for the same purpose. The presentation of diagnosis results 510 to end users can be made informative, for example, using the result translator 214 of FIG. 2. The reasoning logic can be explained to the end users to help them understand the final conclusion through the user display and alerting 216 of FIG. 2. A final diagnostic decision, as well as recommended inspection and maintenance activities, can be determined or confirmed by an end-user based on the diagnosis results 510 and/or other information as accessed via the user display and alerting 216 of FIG. 2.

In the example of FIG. 5, the reasoning system 500 uses a sparse Diagnosis-Matrix (D-Matrix) based fuzzy inference system 512 that utilizes additional evidence 508 to resolve ambiguity from SFI 504. A D-Matrix is a sparse matrix that connects fault modes in an SFI ambiguity group to supporting modules of analytic engines 206. A D-Matrix can be formed as a two dimensional layout of a tree structure for ambiguity resolution, and is "sparse" since all elements of the D-Matrix are not required for the reasoning system 500 to work. Each module of the analytic engines 206 can be implemented for a specific function, but its output format can be standardized to provide a belief (or confidence) for a fault hypothesis being tested. The reasoning system 500 combines evidence from all sources and make a final decision.

Figure 6:
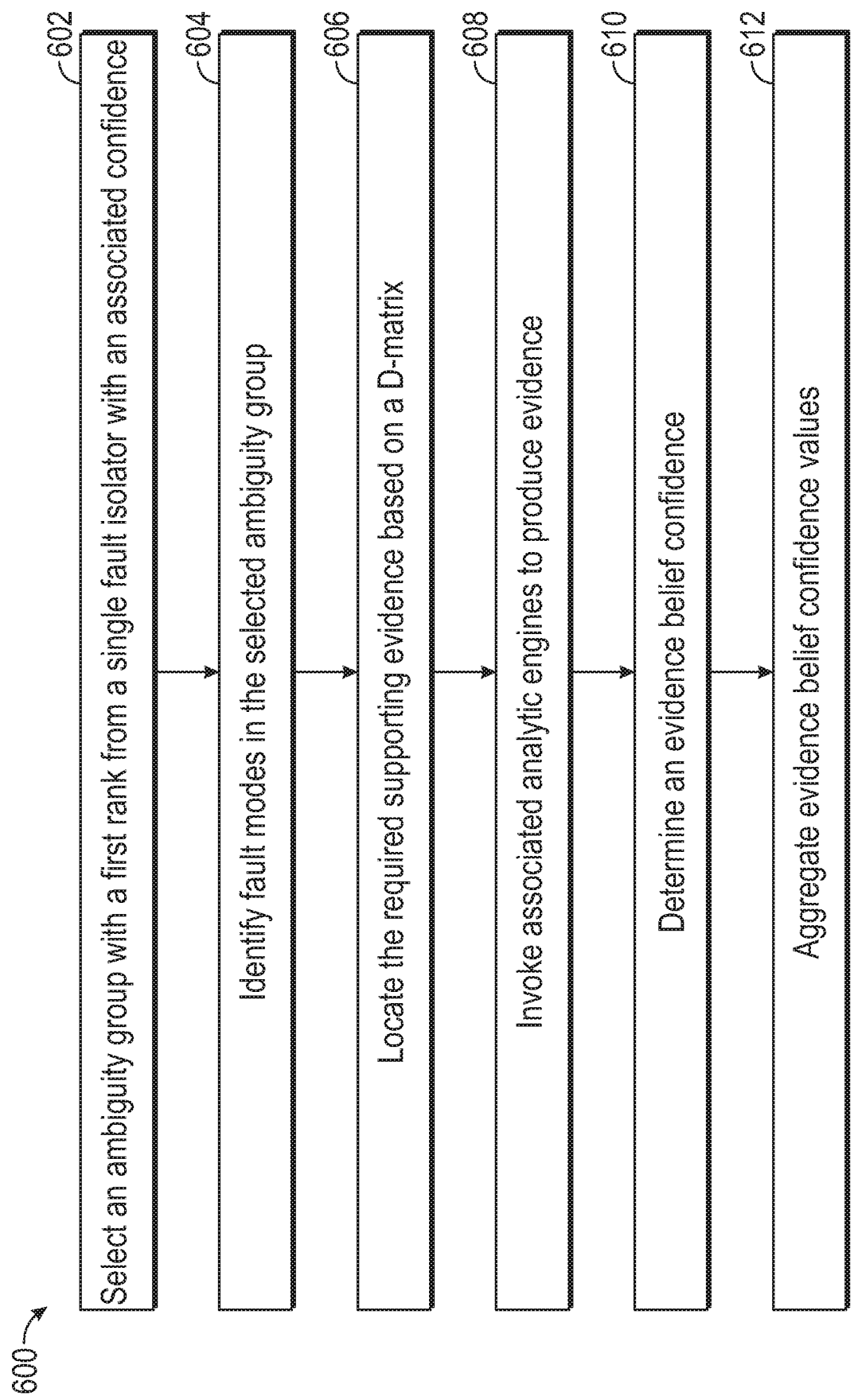
FIG. 6 is a flow chart illustrating a method, in accordance with an embodiment of the disclosure.

An overall reasoning process 600 of FIG. 6 can be conducted by the reasoning system 500 as follows. At block 602, an ambiguity group with a first rank (e.g., first ranked AG 506) can be selected from SFI 504 with an associated confidence. At block 604, fault modes of the selected AG are identified, for instance, using a table look-up. At block 606, required supporting evidence can be located based on a D-Matrix by the fuzzy inference system 512. At block 608, one or more associated analytic engines 206 can be invoked to produce evidence 508 based on a data values from one or more data repository 120. At block 610, an evidence belief confidence can be determined by the fuzzy inference system 512. At block 612, the fuzzy inference system 512 can aggregate evidence belief confidence values. In embodiments, the knowledge base 210 of FIG. 2 can include table-driven rules to support reasoning operations performed by the fuzzy inference system 512. Expansion and maintenance of the knowledge base 210 can be handled through a D-Matrix structure.

Typically an experienced analyst attempts to resolve diagnosis ambiguity by leveraging information/data that exist in the data repository 120 without an automated system. The connection of relevant information to the underlying problem, as well as the effectiveness of the reasoning, depends on the domain knowledge and experience of the analyst, which varies from individual to individual. The artificial intelligence embedded in the knowledge base 210 is not only useful for the reasoning system 500, but can also be beneficial in analyst training, i.e., less experienced analysts can be trained by the reasoning system 500.

The knowledge base 210 can be constructed using a D-Matrix 700 as depicted in FIG. 7 by incorporating an SFI ambiguity group matrix 702 that defines a relationship between ambiguity groups AG1-AGm and SFI faults (Fault1-Faultm). The fault modes in each ambiguity group AG1-AGm can be examined and domain knowledge can be applied to distinguish between fault modes. It can be beneficial to leverage fault isolation rules from models of the monitored system 100 of FIG. 1, for instance. The applicability of fault isolation rules can be restricted by the availability of relevant data which may vary. Experts with detailed knowledge of the monitored system 100 of FIG. 1 can assist in formulating fuzzy expert rules. Field data can be used to validate and improve the fuzzy expert rules defined in the knowledge base 210.

Within the D-Matrix 700 of FIG. 7, rows are fault modes and columns are evidence. The values of elements in the D-Matrix 700 can represent the expected symptoms for faults (Fault1-Faultm and FaultX1-FaultXn in rows) evaluated by the analytic engines 206 associated with the evidence (SFI evidence 704 and additional evidence 706 in columns). The D-Matrix 700 can include several independent diagnostic matrices that relate evidence (i.e., observed or calculated health indicator) to underlying fault modes. SFI faults 708 constitute one such diagnostic matrix which can be placed at the top left corner of the D-Matrix 700 including evidence columns AG1-AGm. The SFI ambiguity group matrix 702 can be converted directly from the risk-adjusted confusion matrix 400 of FIG. 4 by mapping non-zero values to ones. The SFI ambiguity group matrix 702 has no empty element (i.e., not sparse) in the example of FIG. 7. For example, if the SFI 504 of FIG. 5 returns a first ranked AG 506 as AG3 (e.g., HPT Performance fault), then there is confusion as to whether the fault is an HPT Performance fault (Fault1 in D-Matrix 700) or a turbine case cooling (TCC) fault (Fault3 in D-Matrix 700) indicated by the 1's in the AG3 column.

The columns following the AGs (AG1-AGm) represent additional evidence 706 (if available) to resolve the confusion. To illustrate the construction of the additional evidence 706, a simplified ambiguity resolution scenario can include selecting between the HPT performance fault and TCC fault. Engine HPT performance faults (e.g., HPT blade fracture) can share a similar fault signature as TCC faults (e.g., cooling air leakage or actuation system failure). Knowing that TCC is not activated at takeoff for a particular engine type, the engine takeoff performance (e.g. takeoff EGT margin) can be checked. If takeoff EGT margin has also dropped, it is more likely that the fault is related to HPT performance. Otherwise, it would more likely be TCC related. To capture this reasoning process, a column "Evidence2" can be added with a "−1" assigned to the element intersecting with Fault1 (HPT Performance Fault in this example) and a "0" assigned to Fault3 (TCC fault). It will be understood that more descriptive column titles can be used for a specific implementation, e.g., "Evidence2" could be replaced by "Takeoff EGT Margin Shift", where a value of "−1" indicates a "drop" and a value of "0" indicates "no change". If available, other parameters can be checked, such as vibration parameters, controller fault words, additional TCC system parameters, recent maintenance records related to TCC system, and the like. This domain knowledge can also be captured as additional columns in additional evidence 706 of the D-Matrix 700. The knowledge base 210 of FIG. 2 (thus the D-Matrix 700) is not only applicable to gas path performance faults in the engine example. The knowledge base 210 can be generalized to handle any fault mode as long as the integration benefits fault isolation without introducing excessive complexity. Other diagnostic matrices within the D-Matrix 700 may relate, for example, to mechanical system faults to related mechanical system symptoms, e.g., bearing fault to oil temperature, pressure, filter delta pressure, oil debris monitor (ODM) count and rate, vibration indicators, etc. These matrices can be captured in the lower portion of the D-Matrix 700 as other faults 710 (FaultX1-FaultXn) with associated columns of additional evidence 706.

The D-Matrix 700 can to be sparse (with the exception of the SFI ambiguity group matrix 702) for several reasons. First, knowledge of faulty behavior may be incomplete or uncertain. As the knowledge base 210 grows, the size of the D-Matrix 700 grows. It may become infeasible to fill in expected values for all the elements of the D-Matrix 700 to maintain complete connectivity between all fault modes and evidence sources. Meanwhile, improper assignment of expected symptoms may adversely impact the final reasoning output in the diagnosis results 510. Secondly, certain fault mode/evidence connectivity may not be applicable. For example, engine mechanical system faults may not affect engine performance parameters. Therefore, the intersection of other faults 710 and SFI evidence 704 can be left blank. A blank in the D-Matrix 700 represents that the evidence (column) provides no supportive or contradictive evidence. Analytic engines 206 may be used if non-blank entries are indicated. Sparse population of the D-Matrix 700 can reduce data storage requirements and reduce search/execution times, as fewer values need to be searched and fewer comparisons performed.

Metadata of the D-Matrix 700 (i.e., row and column descriptions and configuration parameters) define connections between fault modes and analytic engines 206, as well as the parameters utilized by the reasoning system 500 to combine evidence. The column names (evidence source) can be made descriptive of designated purposes (e.g., "takeoff EGT margin shift", "actuator position feedback out of range", "vibration increase", etc.). A column description (or index) can be used to look up the corresponding analytic engine 206 module from a configuration file (or a database table). Therefore, the analysis system 122 setup can be configurable (or table-driven).

Each of the analytic engines 206 can be developed for a dedicated purpose with its own specific inputs, logic and algorithms. The output of analytic engines 206 can be standardized to be integrated with the reasoning system 500. As one example, the output of an analytic engine 206 can be a set of duplets: $\{(S_i, B_i)_{i=1, \ldots M}\}$, where $S_i$ is a fuzzy value for the expected fault symptom, $B_i$ is the belief that the symptom is observed, and M is the total number of fault modes that the analytic engine 206 is associated to in its column in the D-Matrix 700. Fuzzy values can be represented by discrete integers (e.g., 1, 0, −1) for convenience and occupy the non-empty cells in the D-Matrix 700.

Figure 8:
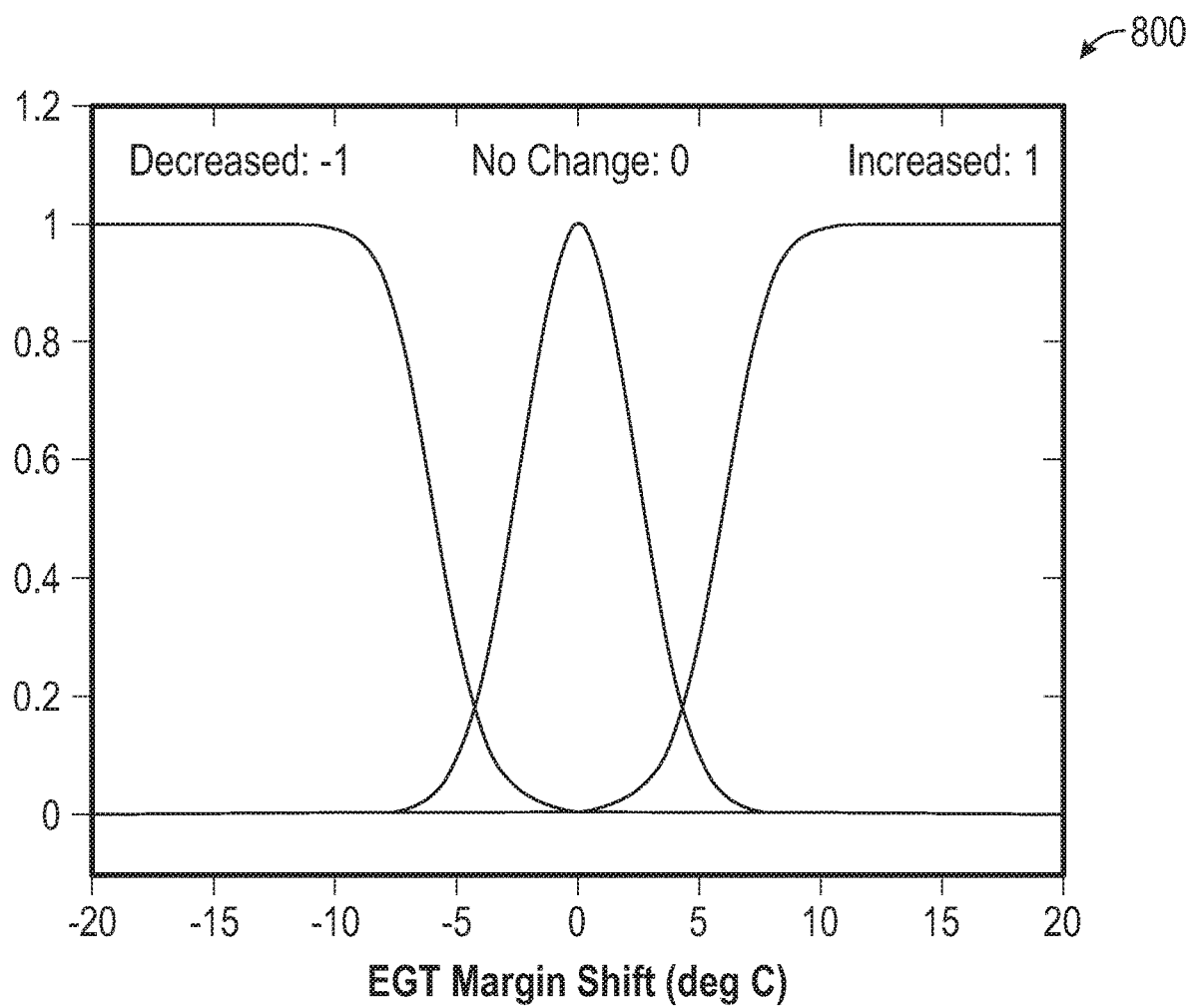
FIG. 8 is a plot of an example of fuzzy membership functions, in accordance with an embodiment of the disclosure.

Although the algorithms for an analytic engine 206 can take any form, embodiments can be implemented as a fuzzy inference system. For example, the analytic engine 206 for "takeoff EGT margin shift" can pull EGT margin data from recent flights and calculate the difference between the latest value and the past average. Once the difference has been calculated, a belief for each expected symptom (e.g., "increased", "decreased", "no change") can be assigned. While belief assignment can be done in various ways, one approach is to apply fuzzy membership functions 800 as depicted in FIG. 8. With the particular set of fuzzy membership functions 800, a calculated EGT margin drop of 7 degrees would produce the belief for "decreased", "no change" and "increased" as shown in Table 2. This implies that if takeoff EGT margin drop is anticipated as the consequence of a particular fault mode, an observed margin drop of 7 degrees provides a belief (confidence) of 0.73 supporting this fault mode, while a belief of 0 will be assigned to any fault mode that anticipates EGT margin recovery.

TABLE 2

Fuzzy belief/confidence mapping

| Symptom | Value | Belief |
| --- | --- | --- |
| Decreased | −1 | 0.73 |
| No change | 0 | 0.01 |
| Increased | 1 | 0 |

Each different type of the monitored system 100 of FIG. 1 can have its own specific rules for fault isolation, and there can be common rules across different types of monitored systems 100, such as different families of aircraft engines. For an aircraft engine example, supporting evidence may be used from digitalized maintenance records, post-flight aircraft reports, controller fault words, subsystem internal parameters, aircraft parameters, and comparison with companion engines, etc. The analytic engines 206 performing these functions can be implemented as general modules and be reused across programs for different aircraft engine variations, for example.

Analytic engines 206 can also be designed to extract health information from full flight data. In general, full flight data, rather than event or snapshot data, can increase the depth and breadth of data coverage, where depth refers to continuous (i.e., high sampling rate) recording of engine parameters that analytic engines 206 can utilize for transient fault diagnosis, and breadth refers to the additional parameters that are not typically found in snapshot data. These additional parameters and features/alerts generated from full flight based data for analytic engines 206 can all be utilized by the reasoning system 500 for improved fault diagnosis performance.

In some embodiments, analytic engines 206 can be integrated within the monitoring system 101 of FIG. 1; however, such integration may be limited if the relevant data resides in different systems/databases. A well-integrated big data infrastructure can be used to supply the reasoning system 500 with data, especially when full flight analytics or other such large volume data sources are involved.

The combination of evidence can be conducted in various ways with different algorithms. As one example, the presence of supporting evidence can be used to promote related fault modes, an absence of an anticipated symptom can demote related fault modes (e.g., negative information), and unknown information may not affect the reasoning process.

Depending on the reliability of sources (i.e., the analytic engines 206 and the integrity of the data utilized), various combination rules can be utilized. In a situation where all sources are considered reliable, a conjunctive operation may be appropriate (e.g., A and B and C). In the case where only one source is deemed reliable, the use of a disjunctive combination operation (e.g., A or B or C) may be preferred. Conjunctive rules strongly emphasize the agreement between multiple sources and may produce counterintuitive results in the presence of conflicting evidence. A disjunctive rule may be dominated by a single strong source. To overcome these issues, other types of combination rules can be used, such as discount and combine, convolutive averaging, and mixing.

In some embodiments, a combination of evidence for each fault mode j cam be performed using the following equation:

$$B_j = \frac{\sum_{evidence} w_i \beta_j^i}{\sum_{evidence} w_i} \qquad \text{(equation 1)}$$

where $w_i$ is a discounting factor representing the degree of trust associated with the i-th Analytic Engine, and $\beta_j^i$ is the degree of belief that the i-th Analytic Engine supports the j-th fault mode, and $B_j$ is the combined belief. Conventional SFI can be considered a special instance of an analytic engine 206 for gas path performance. Belief/confidence can be related to the SFI measurement error norms for each fault mode.

Similarly, the belief/confidence can be calculated by applying a fuzzy membership function 800 of FIG. 8 or can take a simpler form as:

$$\beta_j^i = 1 - \|e_j\| \qquad \text{(equation 2)}$$

where $\|e_j\|$ is the normalized error for the j-th fault mode calculated by the SFI 504. A smaller normalized error can result in a higher belief/confidence. The degree of belief reflects the concept of confidence (or trust) which may not have the mathematical properties of probabilities.

Fault modes in an ambiguity group can be ranked based on a combined belief. A fault mode with the highest belief is the ambiguity resolution derived from available evidence. The following are some examples of rules that can be utilized in the knowledge base 210 of FIG. 2: 1) module faults (particularly due to structural damage) are often accompanied by increased vibration; 2) stability bleed system faults are often accompanied by considerable Takeoff EGT Margin drop at a larger magnitude than typically observed on module faults in the same ambiguity group; 3) sensor faults can often be confirmed by comparing with a companion engine; 4) actuation system internal parameters can be used to validate actuator faults; and 5) redundant measurements can be effective in isolating sensor faults.

Figure 9:
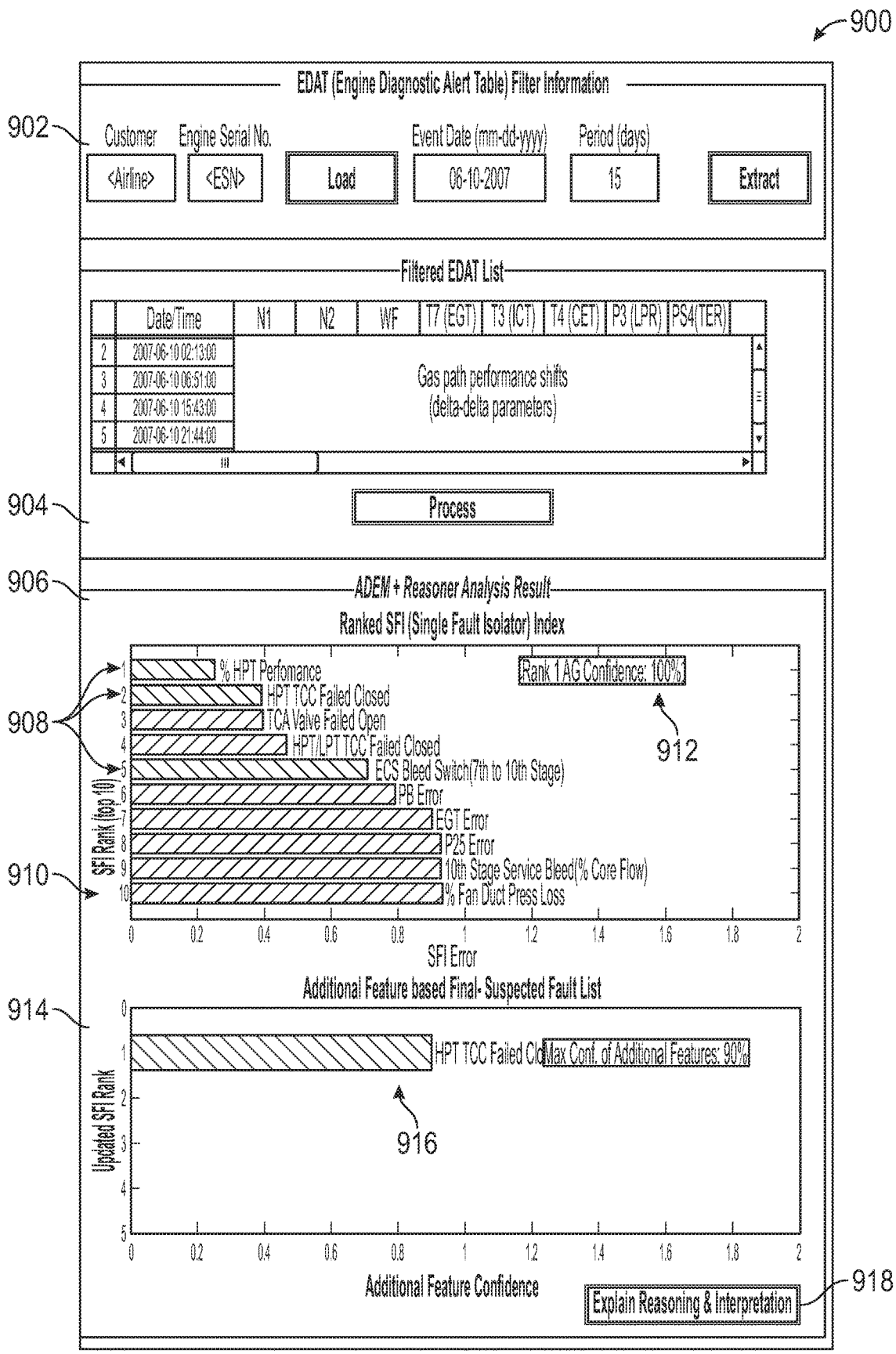
FIG. 9 is an example of a graphical user interface, in accordance with an embodiment of the disclosure.

FIG. 9 depicts an example of a GUI 900 that can be provided through user display and alerting 216 of FIG. 2. The example of FIG. 9 is provided with respect to an aircraft engine for purposes of explanation and can be adapted for various types of monitored systems. The GUI 900 can access multiple databases, such as data repository 120A-120N of FIG. 2, fleet event history 202 of FIG. 2, and other data sources (not depicted) for fault records and associated data. As shown in FIG. 9, a filter interface 902 can allow events to be accessed based on customer name, engine serial number (ESN), and/or event date. Once event data is extracted, the related gas path performance data (delta-delta parameters) can be shown in a filtered list 904. Other displayed information can include, for instance, an SFI output 906 that identifies the first ranked AG 908 and lower ranked AGs 910. The SFI output 906 is depicted as a bar chart with the bar length indicating the SFI Measurement Error Norms for each fault mode. The confidence for the first ranked AG 908 is shown as AG confidence 912. In this case, the first ranked AG 908 includes a combination of "HPT performance", "HPT TCC failed Closed", and "ECS Bleed Switch". The confidence that the actual fault belongs to this AG is very high (100%) in this example. An ambiguity resolution plot 914 indicates a top ranked fault mode 916 calculated by the reasoning system 500 of FIG. 5 with a confidence associated with the additional evidence indicated by the length of the bar. In this case, the top ranked fault mode 916 is HPT TCC Failed Closed with a confidence of 90%. Note that the final resolution need not be the top ranked fault from the SFI output 906. In this example, because takeoff EGT margin did not drop, the HPT performance fault hypothesis (indicated as rank one in the SFI output 906) is demoted.

Figure 10:
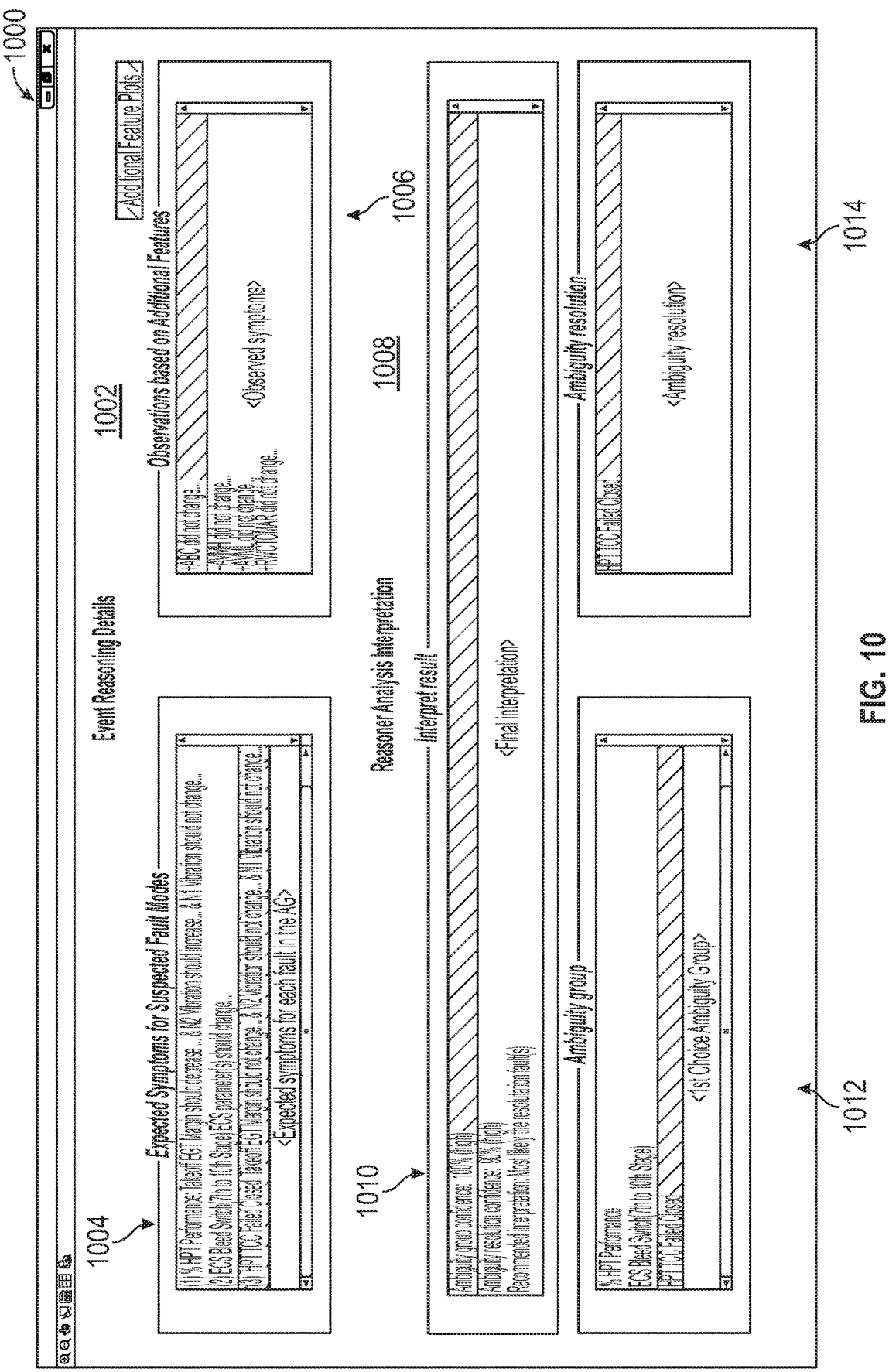
FIG. 10 is another example of a graphical user interface, in accordance with an embodiment of the disclosure.

The reasoning system 500 of FIG. 5 can explain the reasoning process, for example, in response to selection of an "Explain Reasoning & Interpretation" button 918. The selection of button 918 can result in displaying GUI 1000 of FIG. 10. Event reasoning details 1002 provided by the GUI 1000 can include expected symptoms for suspected fault modes 1004 and observations based on additional features 1006 as supporting evidence for each fault in an AG. For example, HPT performance fault may result in takeoff EGT margin drop and increased N2 vibration, but may not affect N1 vibration much. These expected supporting symptoms can be explained in natural language. For example, result translator 214 of FIG. 2 can associate an expected fault symptom (e.g., 0, 1, −1) to a linguistic interpretation defined in metadata of D-Matrix 700 of FIG. 7. The observations based on additional features 1006 can list the observations in natural language, e.g., "Takeoff EGT Margin did not increase". A translation of the output of analytic engines 206 of FIG. 2 to corresponding fuzzy linguistic terms from fuzzy membership functions 800 of FIG. 8 can also be defined in the metadata. A reasoner analysis interpretation 1008 of the GUI 1000 can include a recommended interpretation 1010, e.g., "Ambiguity group confidence: 100% (high); Ambiguity resolution confidence: 90% (high); Recommended interpretation: most likely the resolution fault" (since both SFI AG confidence and additional evidence confidence high in this case). An ambiguity group window 1012 can list faults of the first ranked AG 908 of FIG. 9, and an ambiguity resolution window 1014 can identify the top ranked fault mode 916 of FIG. 9.

Figure 11:
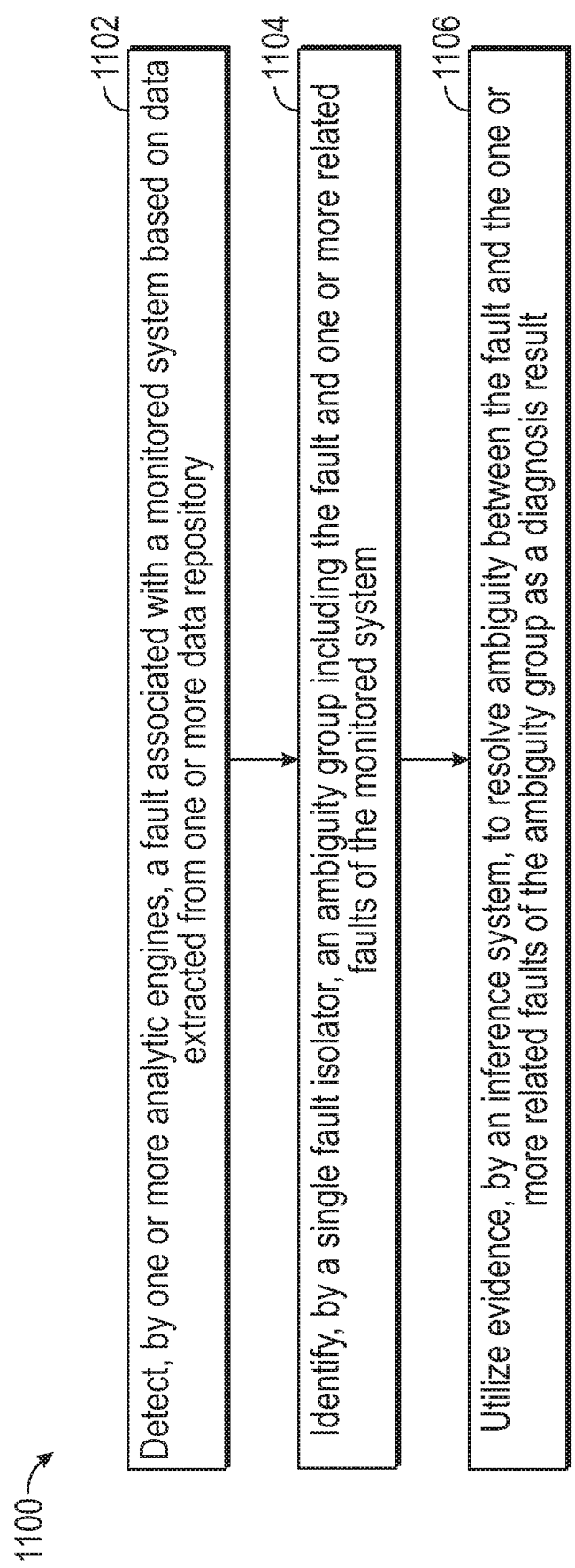
FIG. 11 is a flow chart illustrating a method, in accordance with an embodiment of the disclosure.

Referring now to FIG. 11 with continued reference to FIGS. 1-10. FIG. 11 is a flow chart illustrating a method 1100 for fault isolation and ambiguity resolution of a monitored system 100, in accordance with an embodiment. At block 1102, a fault associated with a monitored system 100 is detected by one or more analytic engines 206 based on data extracted from one or more data repository 120.

At block 1104, an ambiguity group including the fault and one or more related faults of the monitored system 100, such as first ranked AG 506, is identified by the SFI 504. The SFI 504 can determine a measure of closeness to isolate the fault and the one or more related faults to the ambiguity group from a plurality of possible faults. For example, the reasoning system 500 can form a confusion matrix 300 including a plurality of results from the SFI 504 indicative of a degree of fault ambiguity between an implanted fault and an observed fault. The reasoning system 500 can discard one or more values from the confusion matrix 300 below a predetermined risk level to form a risk-adjusted confusion matrix 400.

At block 1106, inference system 512 utilizes evidence 508 to resolve ambiguity between the fault and the one or more related faults of the ambiguity group as a diagnosis result 510. The inference system 512 can form a D-matrix 700 including an ambiguity group matrix 702 based on the risk-adjusted confusion matrix 400, additional evidence 706 indicating relationships between the implanted faults, and one or more relationships between a plurality of symptoms and one or more other faults 710. The D-matrix 700 can be sparsely populated with one or more of the relationships being undefined. The reasoning system 500 can also perform an ambiguity group ranking and determining an associated confidence. The associated confidence can be determined based on a fuzzy belief mapping (e.g., table 2) that assigns relative differences with respect to past values to compare an anticipated consequence with an observed consequence. The reasoning system 500 can also implement the process 600 of FIG. 6. The diagnosis result 510 can be output on GUI 900 of FIG. 9 with access provided through GUIs 900, 1000 to event reasoning details 1002 and reasoner analysis interpretation 1008 associated with the diagnosis result 510 responsive to a selection (e.g., button 918).

While the above description has described the flow process of FIG. 11 in a particular order, it should be appreciated that unless otherwise specifically required in the attached claims that the ordering of the steps may be varied.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A fault isolation and ambiguity resolution system comprising:
   one or more analytic engines executable by a processing system, the one or more analytic engines operable to detect a fault associated with a monitored system based on data extracted from one or more data repository; and
   a reasoning system comprising:
      a single fault isolator operable to identify an ambiguity group including the fault and one or more related faults of the monitored system; and
      an inference system operable to utilize evidence to resolve ambiguity between the fault and the one or more related faults of the ambiguity group as a diagnosis result using a reasoning process configured to:
         perform an ambiguity group ranking and determine an associated confidence;
         select the ambiguity group having a first rank;
         identify a plurality of fault modes in the ambiguity group having the first rank;
         locate supporting evidence based on a diagnosis matrix for the identified plurality of fault modes;
         invoke the one or more analytic engines to produce evidence based on accessing the one or more data repository for the supporting evidence;
         determine an evidence belief confidence for the supporting evidence; and
         aggregate the evidence belief confidence for the fault modes.

2. The fault isolation and ambiguity resolution system of claim 1, wherein the single fault isolator is operable to determine a measure of closeness to isolate the fault and the one or more related faults to the ambiguity group from a plurality of possible faults.

3. The fault isolation and ambiguity resolution system of claim 2, wherein the reasoning system is operable to form a confusion matrix comprising a plurality of results from the single fault isolator indicative of a degree of fault ambiguity between an implanted fault and an observed fault.

4. The fault isolation and ambiguity resolution system of claim 3, wherein the reasoning system is operable to discard one or more values from the confusion matrix below a predetermined risk level to form a risk-adjusted confusion matrix.

5. The fault isolation and ambiguity resolution system of claim 4, wherein the reasoning system is operable to form the diagnosis matrix comprising an ambiguity group matrix based on the risk-adjusted confusion matrix, additional evidence indicating relationships between the implanted faults, and one or more relationships between a plurality of symptoms and one or more other faults.

6. The fault isolation and ambiguity resolution system of claim 5, wherein the diagnosis matrix is sparsely populated with one or more of the relationships being undefined.

7. The fault isolation and ambiguity resolution system of claim 1, wherein the associated confidence is determined based on a fuzzy belief mapping that assigns relative differences with respect to past values to compare an anticipated consequence with an observed consequence.

8. The fault isolation and ambiguity resolution system of claim 1, further comprising a user display operable to output a graphical user interface comprising the diagnosis result and operable to provide access to event reasoning details and reasoner analysis interpretation associated with the diagnosis result responsive to a selection.

9. A method of fault isolation and ambiguity resolution, the method comprising:
   detecting, by one or more analytic engines, a fault associated with a monitored system based on data extracted from one or more data repository;
   identifying, by a single fault isolator, an ambiguity group including the fault and one or more related faults of the monitored system; and
   utilizing evidence, by an inference system, to resolve ambiguity between the fault and the one or more related faults of the ambiguity group as a diagnosis result by performing a plurality of operations comprising:
      performing an ambiguity group ranking;
      determining an associated confidence;
      selecting the ambiguity group having a first rank;
      identifying a plurality of fault modes in the ambiguity group having the first rank;
      locating supporting evidence based on a diagnosis matrix for the identified plurality of fault modes;
      invoking the one or more analytic engines to produce evidence based on accessing the one or more data repository for the supporting evidence;
      determining an evidence belief confidence for the supporting evidence; and
      aggregating the evidence belief confidence for the fault modes.

10. The method of claim 9, further comprising:
    determining a measure of closeness to isolate the fault and the one or more related faults to the ambiguity group from a plurality of possible faults.

11. The method of claim 10, further comprising:
    forming a confusion matrix comprising a plurality of results from the single fault isolator indicative of a degree of fault ambiguity between an implanted fault and an observed fault.

12. The method of claim 11, further comprising:
    discarding one or more values from the confusion matrix below a predetermined risk level to form a risk-adjusted confusion matrix.

13. The method of claim 12, further comprising:
    forming the diagnosis matrix comprising an ambiguity group matrix based on the risk-adjusted confusion matrix, additional evidence indicating relationships between the implanted faults, and one or more relationships between a plurality of symptoms and one or more other faults.

14. The method of claim 13, wherein the diagnosis matrix is sparsely populated with one or more of the relationships being undefined.

15. The method of claim 9, wherein the associated confidence is determined based on a fuzzy belief mapping that assigns relative differences with respect to past values to compare an anticipated consequence with an observed consequence.

16. The method of claim 9, further comprising:
outputting a graphical user interface comprising the diagnosis result; and
providing access through the graphical user interface to event reasoning details and reasoner analysis interpretation associated with the diagnosis result responsive to a selection.

* * * * *